E. ROSENBERG.
WINDINGS FOR ELECTRICAL MACHINES.
APPLICATION FILED JAN. 17, 1907.
1,084,364.
Patented Jan. 13, 1914.
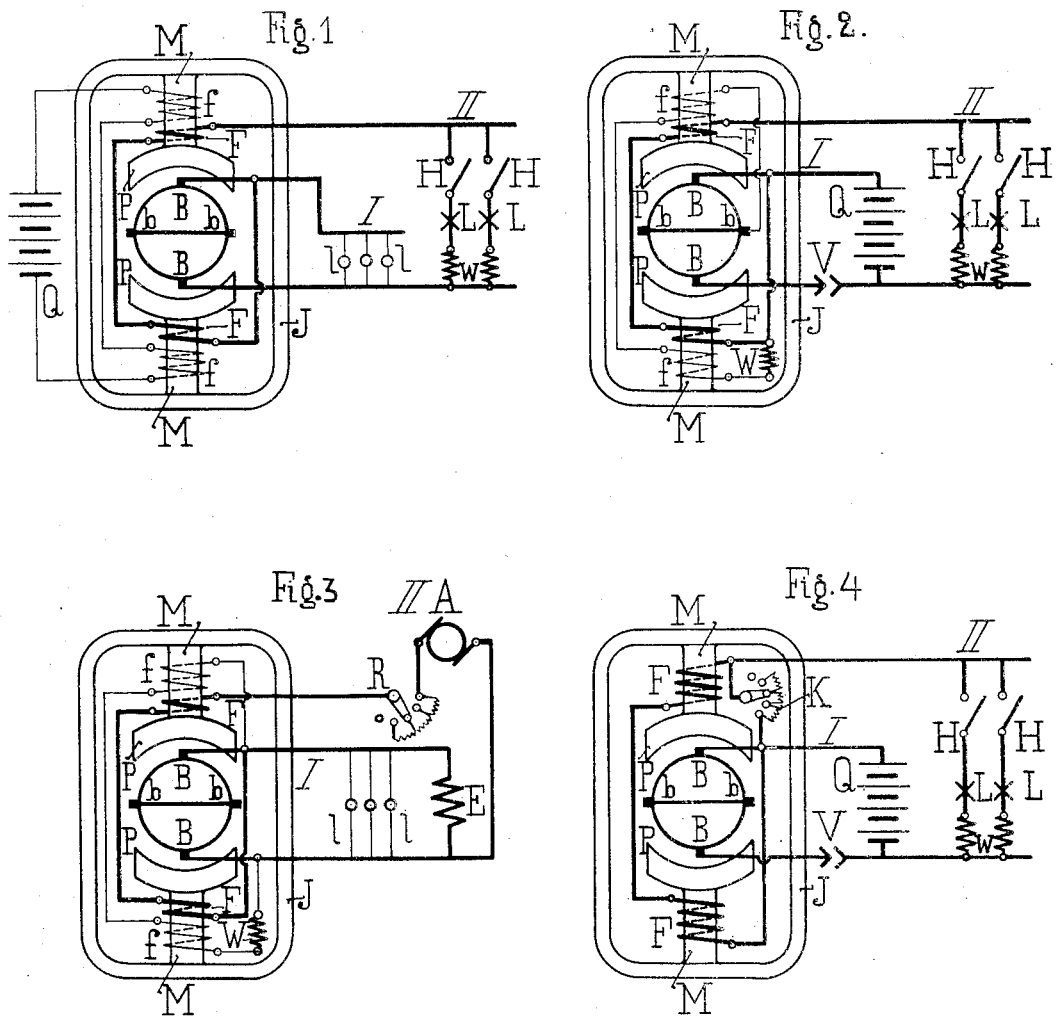
Witnesser:
Julius Rumland
Karl Nickeben
Inventor:
Emanuel Rosenberg

UNITED STATES PATENT OFFICE.

EMANUEL ROSENBERG, OF BERLIN, GERMANY.

WINDINGS FOR ELECTRICAL MACHINES.

1,084,364. Specification of Letters Patent. Patented Jan. 13, 1914.

Application filed January 17, 1907. Serial No. 352,707.

*To all whom it may concern:*

Be it known that I, EMANUEL ROSENBERG, a subject of the Emperor of Austria-Hungary, residing at 5 Kirchstrasse, Berlin, Germany, have invented certain new and useful Windings for Electrical Machines, of which the following is a specification.

In United States Letters Patent No. 954,468, granted to Heinrich and Emanuel Rosenberg on April 12, 1910, and relating to "windings for electrical machinery" there are described continuous current machines which, at a constant excitation of the field, supply a current of nearly constant strength, even when the speed of rotation or the resistance of the external circuit varies within fairly wide limits.

The present invention is applicable to all kinds of dynamos described in the patent above referred to, but is here explained only with reference to its applicability to that type of construction wherein there is produced in the armature by means of a short-circuited set of brushes an oblique field which on its part acts inductively on the effective brushes, which are displaced in relation thereto to the extent of half an interpolar division and wherein the reaction of the effective armature current opposes the primary field.

The present invention relates to dynamos for divided circuits wherein either the current in one branch of the circuit is maintained constant, while the current in other branches may be varied as desired without thereby exerting any appreciable influence on the potential of the dynamos, or wherein the portion of the current last referred to exercises a considerable influence on the current of the first mentioned branch also.

Figure 1 of the accompanying drawings shows a dynamo with an independently excited field winding and with an armature which supplies a series field winding and two external circuits. Fig. 2 shows a dynamo which is self-exciting and which feeds a battery circuit and a lamp circuit, such as is usual in the case of self-exciting installations for train-lighting. Fig. 3 shows a self-excited dynamo which supplies a lamp circuit and a motor, and Fig. 4 shows a modification of the dynamo shown in Fig. 2, the magnetic field in this case being furnished with a single winding only.

In Fig. 1, $b\ b$ are the short-circuited auxiliary brushes of the armature and B B the effective brushes. The magnetic circuit, which consists of the pole shoes P P, the poles M M and the yoke J, is furnished with a field winding $f$, which is supplied with current from an external source Q. From the effective brushes B B there is directly led off a circuit I of constant resistance which may consist, for instance, of a number of incandescent lamps $l\ l$ constantly in circuit. The other part I I of the load may on the other hand consist of lamps L L having a variable current consumption provided with regulating resistances $w$ and switches H. Upon the poles M M there is arranged a winding F, which is wound in the same sense as the winding $f$, and is connected in series with the circuit I I. A primary field which passes through the yoke, the poles, the pole shoes and the armature iron acts inductively upon the armature wires. If the brushes $b\ b$ were not connected, the primary field would create a potential difference between the brushes $b\ b$, whereas the main brushes B B would be equipotential. As the brushes $b\ b$ are short-circuited a current will flow through the armature. This short-circuited current magnetizes the armature on an axis shifted in the direction of rotation by 90 electrical degrees from the axis of the primary field. I call this field produced by the short-circuited current in the armature the secondary field. It is due to the latter that a voltage is produced between the main brushes B B. Through the external circuits connected to the main brushes B B a current will flow and this current in the armature conductors produces a third field, the axis of which is displaced by 90 electrical degrees from the axis of the secondary field, or by 180 electrical degrees from the axis of the primary field. In most cases the dynamo is run with such a voltage that the short-circuited current in the armature is smaller than the main current flowing in the brushes B B. To produce the short-circuited current of this value between the short-circuited brushes requires only a small working part of the primary field, and therefore the main current of the dynamo reaches automatically, if the external resistance is not excessive, such a value that the third field is nearly equal to the primary field. A limiting value of the main current for which the third field would be exactly equal to the primary field cannot exactly be reached however high the speed of the armature and however low the resistance of the external circuit may become. Since the secondary field has opposite direction if the direction of rotation of the armature is reversed, the main brushes B B give a current of constant direction. In order to explain the action of the special arrangement of field windings shown in Fig. 1, assume that the field winding $f$ and the constantly connected circuit I do not exist, which would leave a series-wound dynamo with a circuit I I of variable resistance. The dynamo requires only a very weak initial field. Assume that the leakage of the magnetic field produced by the armature is not so great that it necessitates a primary field of sufficient strength to produce a considerable degree of saturation in the magnet poles. Then by disregarding leakage and assuming that the number of turns of the series field winding is just equal to the effective turns of the armature winding then, provided the ohmic resistance and the residual magnetism of the machine is left out of account, the machine will always be magnetically in equilibrium for any current passing through the circuit I I. It is clear that in such circumstances accidental conditions, such as the residual magnetism which may happen to exist, must exercise great influence upon the potential and the current strength of circuit I I. To this must, however, be added the continuously excited winding $f$ and the circuit I of constant resistance. By this means there is selected from the many possible equilibrium conditions a certain definite one. Were there nothing but the winding $f$ excited from an external source, and the circuit I, the current in that circuit would be such as to produce approximate equilibrium with the exciting ampere turns. In this manner not only the current in the circuit I, but also the potential at the effective brushes B B is constant. Nothing is altered by the addition of a variable resistance in circuit I I, as the added ampere turns in the armature are balanced by the added ampere turns of the series winding F.

Fig. 2 illustrates an example of the application of this invention to train lighting installations. It is assumed that the circuit I is that of the storage battery Q, while the circuit I I is formed by groups of lamps L L, which can separately be put out of circuit, and which are provided with regulating resistances $w$ composed for instance of iron wire. At V there is indicated an apparatus such, for instance as an electrolytic valve, by means of which the current is prevented from returning from the battery into the dynamo. The winding $f$ is in this instance fed by the dynamo itself at half the potential of the dynamo, one end being connected with the main brush B and the other end with the potential-dividing auxiliary brushes $b, b$. There is here shown in series with the field winding, a resistance W consisting of iron wire, which by virtue of the high temperature coefficient of such wire, will tend to maintain the exciting current at constant strength when the potential applied to the terminals of the field circuit varies. If the lamp circuit I I is completely disconnected the dynamo tends to send a current of a certain strength into the battery. Should some or all of the lamps be connected in circuit, while the dynamo is in operation, the potential and the charging current remain unaltered, the current delivered by the dynamo being increased by the amount required by the lamp circuit. By decreasing or increasing the number of turns of the winding F it is possible so to vary the character of the machine that if the current in circuit I I, is increased, the current in circuit I does not remain constant, but decreases or increases.

In Fig. 3 the circuit I consists of lamps $l\ l$ and of the exciting winding E of a motor, while the armature A of the motor, which takes the variable current, with its starting resistance R forms circuit I I. The exciting winding $f$ is fed in this instance by the effective brushes B B through an intermediate resistance W.

In Fig. 4 there is illustrated a modification of the apparatus shown in Fig. 2 wherein the winding $f$ is dispensed with while the winding F is correspondingly strengthened. This will have the following effect:— If no lamp current is used, the magnetic field will not be excited and the dynamo will consequently transmit no current to the accumulator battery, or at most only very little, which can be accounted for by the presence of residual magnetism. When lamps are put in circuit, current will pass also through the winding F. If the winding is suitably proportioned the dynamo will under such conditions supply more current than is consumed in the lamp circuit I I. Consequently the accumulator battery Q in circuit I receives a charging current that bears a certain relation to the lamp current. In the case of installations for lighting trains the rate of charge of the battery, when a train is running, is thus increased when the current consumption at the lamps is increased. This is advantageous because the battery has to supply the whole current required by the lamps whenever the dynamo is inoperative. To enable the ratio of the current produced by the dynamo to the current of the lamp circuit to be varied, there is connected up in parallel with the winding F an adjustable resistance K.

What I claim as my invention and desire to secure by Letters Patent is:—

1. A dynamo-electric machine having means for creating a main magnetic field including a series strengthening coil, and means tending to vary said field in such proportion as would, but for the series strengthening coil, maintain a substantially constant output of the dynamo as its speed of rotation varies, in combination with an external work circuit having a plurality of branches containing translating devices, said branches being so connected to said dynamo that current is supplied to the series strengthening coil and to the translating devices in one branch in series, and directly to the translating device in another branch; substantially as described.

2. The combination with a dynamo having an armature, means for creating in the armature two magnetic fields, one of which is of constant direction and the other of which reverses when the direction of rotation of the armature is reversed, and brushes for leading off to an external circuit the current generated in the armature by the reversing field, of an external circuit having a plurality of branches containing translating devices and connected to said brushes, one of said branches including also a series winding arranged to increase the field of constant direction; substantially as described.

3. The combination with a dynamo having an armature, a main field magnet, a series strengthening coil on said magnet, means for creating in the armature a second magnetic field at an angle to the field of the main field magnet, and brushes for leading off to an external circuit the current generated in the armature by the said second field, of an external work circuit having a plurality of branches containing translating devices, said branches being so connected to said brushes that current is fed through the series strengthening coil to the translating devices in one of said branches and directly to the translating devices in another branch; substantially as described.

4. The combination with a dynamo having an armature, a main field magnet, a series strengthening coil on said magnet, means for creating in the armature a second magnetic field displaced ninety electrical degrees from the field of the main field magnet, and brushes for leading off to an external circuit the current generated in the armature by the said second field, of an external work circuit having a plurality of branches containing translating devices, said branches being so connected to said brushes that current is fed through the series strengthening coil to the translating devices in one of said branches, and directly to the translating devices in another branch; substantially as described.

5. The combination with a dynamo having an armature, a main field magnet, a series strengthening coil on the main field magnet, short-circuited brushes set to collect the current generated in the armature by the main field, and additional brushes set to lead off to an external circuit the current generated in the armature by the field created by the current flowing through the short-circuited brushes, of an external work circuit having a plurality of branches containing translating devices, said branches being so connected to said additional brushes that current is fed through the series strengthening coil to the translating devices in one of said branches and directly to the translating devices in another branch; substantially as described.

6. A dynamo electric machine having means for creating a main magnetic field including a series strengthening coil, and means tending to vary said field in such proportion as would, but for the series strengthening coil, maintain a substantially constant output of the dynamo as its speed of rotation varies, in combination with an external circuit comprising one branch including translating devices constituting a constant load, and a second branch including other translating devices constituting a varying load and also including the said series strengthening coil; substantialy as described.

7. A dynamo electric machine having means for creating a main magnetic field including a series strengthening coil, and means tending to vary said field in such proportion as would, but for the series strengthening coil, maintain a substantially constant output of the dynamo as its speed of rotation varies, in combination with an external circuit comprising one branch including storage battery, and a second branch including other translating devices constituting a varying load and also including the said series strengthening coil; substantially as described.

8. The combination with a dynamo having an armature, a main field magnet, short circuited brushes set to collect the current generated in the armature by the main field, and additional brushes set to lead off to an external circuit, the current generated in the armature by the field created by the current flowing through the short circuited brushes, of an external circuit connected to said additional brushes and comprising one branch including translating devices constituting a constant load, and a second branch including other translating devices constituting a varying load and also including a series coil arranged to strengthen the main field; substantially as described.

9. The combination with a dynamo having an armature, a main field magnet, short-circuited brushes set to collect the current generated in the armature by the main field, and additional brushes set to lead off to an external circuit the current generated in the armature by the field created by the current flowing through the short-circuited brushes, of an external circuit connected to said additional brushes and comprising one branch including a storage battery and a second branch including other translating devices constituting a varying load and also including a series coil arranged to strengthen the main field; substantially as described.

10. A dynamo-electric machine having a main field magnet, a shunt winding on the main field magnet, a series strengthening coil for said field magnet, and means tending to vary said field in such proportion as would, but for the series strengthening coil, maintain a substantially constant output of the dynamo as its speed of rotation varies, in combination with an external circuit having a plurality of branches containing translating devices, said branches being so connected to said dynamo that current is supplied to the series strengthening coil and to the translating devices in one branch in series, and directly to the translating devices in another branch; substantially as described.

11. A dynamo-electric machine having a main field magnet, a shunt winding on the main field magnet, a series strengthening coil for said field magnet, and means tending to vary said field in such proportion as would, but for the series strengthening coil, maintain a substantially constant output of the dynamo, as its speed of rotation varies, in combination with an external work circuit comprising one branch including a storage battery, and a second branch including other translating devices constituting a varying load and also including the series strengthening coil; substantially as described.

In testimony whereof I have hereunto signed my name to this specification in the presence of two subscribing witnesses.

EMANUEL ROSENBERG.

Witnesses:
JULIUS RUNDLAND,
KARL G. MICKEEBEN.